(12) United States Patent
Horita

(10) Patent No.: US 9,437,245 B2
(45) Date of Patent: Sep. 6, 2016

(54) VIDEO RECORDING APPARATUS AND EXTERNAL TERMINAL

(71) Applicant: Panasonic Corporation, Osaka (JP)

(72) Inventor: Seiji Horita, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 33 days.

(21) Appl. No.: 14/335,277

(22) Filed: Jul. 18, 2014

(65) Prior Publication Data

US 2014/0328568 A1 Nov. 6, 2014

Related U.S. Application Data

(62) Division of application No. 12/789,977, filed on May 28, 2010, now abandoned.

(30) Foreign Application Priority Data

May 29, 2009 (JP) ................................. 2009-130396

(51) Int. Cl.
| | |
|---|---|
| H04N 9/80 | (2006.01) |
| H04N 5/89 | (2006.01) |
| G11B 27/19 | (2006.01) |
| G11B 27/034 | (2006.01) |
| G11B 27/10 | (2006.01) |
| G11B 27/11 | (2006.01) |
| G11B 27/036 | (2006.01) |
| H04N 5/77 | (2006.01) |

(52) U.S. Cl.
CPC ............ *G11B 27/19* (2013.01); *G11B 27/034* (2013.01); *G11B 27/036* (2013.01); *G11B 27/10* (2013.01); *G11B 27/11* (2013.01); *H04N 5/77* (2013.01)

(58) Field of Classification Search
USPC ......................... 386/239–241, 248, 332–336
See application file for complete search history.

(56) References Cited

U.S. PATENT DOCUMENTS

| | | | |
|---|---|---|---|
| 6,154,771 A * | 11/2000 | Rangan ................... H04N 5/76 |
| | | | 345/660 |
| 7,624,090 B2 | 11/2009 | Fujisawa et al. | |
| 7,965,919 B2 | 6/2011 | Moriya et al. | |
| 2004/0028393 A1 | 2/2004 | Katata | |
| 2004/0199511 A1 | 10/2004 | Fujisawa et al. | |
| 2005/0141039 A1* | 6/2005 | Niida ................... G11B 27/107 |
| | | | 358/296 |

(Continued)

FOREIGN PATENT DOCUMENTS

| | | |
|---|---|---|
| JP | 7-67066 | 3/1995 |
| JP | 2000-207874 | 7/2000 |

(Continued)

*Primary Examiner* — Nigar Chowdhury
(74) *Attorney, Agent, or Firm* — Wenderoth, Lind & Ponack, L.L.P.

(57) ABSTRACT

An external terminal having a communication unit capable of communicating with a video recording apparatus, the external terminal includes an input unit operable to input additional information from a user, an input start detecting unit operable to detect start of the input of the additional information to the input unit, and a recording state inquiring unit operable to inquire of the video recording apparatus and acquire information representing a recording position in video data currently being recorded by the video recording apparatus via the communication unit, when the input start detecting unit detects the start of the input of the additional information.

10 Claims, 12 Drawing Sheets

(56) References Cited

U.S. PATENT DOCUMENTS

| | | |
|---|---|---|
| 2006/0245721 A1 | 11/2006 | Moriya et al. |
| 2007/0014539 A1* | 1/2007 | Kohno .................. G11B 27/10 386/230 |
| 2008/0240676 A1 | 10/2008 | Kim et al. |
| 2009/0169187 A1 | 7/2009 | Kohmoto et al. |
| 2009/0252475 A1 | 10/2009 | Chiba et al. |
| 2009/0279848 A1* | 11/2009 | Taguchi .................. G11B 27/11 386/241 |

FOREIGN PATENT DOCUMENTS

| | | |
|---|---|---|
| JP | 2004-62916 | 2/2004 |
| JP | 2006-303594 | 11/2006 |
| JP | 2007-36846 | 2/2007 |
| JP | 2007-82088 | 3/2007 |
| JP | 2008-306398 | 12/2008 |

* cited by examiner

*Fig.3A*

```xml
<?xml version="1.0" encoding="UTF-8" standalone="no" ?>
<P2Main          xmlns:xsi="http://www.w3.org/2001/XMLSchema-instance"
xmlns="urn:schemas-Professional-Plug-in:P2:ClipMetadata:v3.0">
  <ClipContent>
    <ClipName>0001</ClipName>
    <Duratio n>1064</Duration>
    <EditUnit>1001/60000</EditUnit>
    <EssenceList>
      <Video ValidAudioFlag="false">
        <VideoFormat>MXF</VideoFormat>
        <Codec>DV100_720/59.94p</Codec>
        <FrameRate DropFrameFlag="true">59.94p</FrameRate>
        < StartTimecode>05:33:33:12</StartTimecode>
        <StartBinaryGroup>A70F6083</StartBinaryGroup>
        <AspectRatio>16:9</AspectRatio>
        <VideoIndex>
          <StartByteOffset>32768</StartByteOffset>
          <DataSize>255360000</DataSize>
        </VideoIndex>
      </Video>
    </EssenceList>
    <ClipMetadata>
      <DataSource>SHOOTING</DataSource>
      <Access>
      <CreationDate>2007-05-20T08:58:55+00:00</CreationDate>
      <LastUpdateDate>2007-05-20T08:59:14+00:00</LastUpdateDate>
      </Access>
      <Device>
        <Manufacturer>Panasonic</Manufacturer>
        <SerialNo./>
        <ModelName>AJ-HPX2000E</ModelName>
      </Device>
      <Shoot>
        <StartDate>2007-05-20T08:58:57+00:00</StartDate>
        <EndDate>2007-05-20T08:59:14+00:00</EndDate>
      </Shoot>
    </ClipMetadata>
  </ClipContent>
</P2Main>
```

*Fig.3B*

```
<?xml version="1.0" encoding="UTF-8" standalone="no" ?>
<P2Main                xmlns:xsi="http://www.w3.org/2001/XMLSchema-instance"
xmlns="urn:schemas-Professional-Plug-in:P2:ClipMetadata:v3.0">
  <ClipContent>
    <ClipName>0001</ClipName>
    <Duration>1064</Duration>
    <EditUnit>1001/60000</EditUnit>
    <EssenceList>
      <Video ValidAudioFlag="false">
        <VideoFormat>MXF</VideoFormat>
        <Codec>DV100_720/59.94p</Codec>
        <FrameRate DropFrameFlag="true">59.94p</FrameRate>
        <StartTimecode>05:33:33:12</StartTimecode>
        <StartBinaryGroup>A70F6083</StartBinaryGroup>
        <AspectRatio>16:9</AspectRatio>
        <VideoIndex>
          <StartByteOffset>32768</StartByteOffset>
          <DataSize>255360000</DataSize>
        </VideoIndex>
      </Video>
    </EssenceList>
    <ClipMetadata>
      <DataSource>SHOOTING</DataSource>
      <Access>
        <CreationDate>2007-05-20T08:58:56+00:00</CreationDate>
        <LastUpdateDate>2007-05-20T08:59:14+00:00</LastUpdateDate>
      </Access>
      <Device>
        <Manufacturer>Panasonic</Manufacturer>
        <SerialNo./>
        <ModelName>AJ-HPX2000E</ModelName>
      </Device>
      <Shoot>
        <StartDate>2007-05-20T08:58:57+00:00</StartDate>
        <EndDate>2007-05-20T08:59:14+00:00</EndDate>
      </Shoot>
      <MemoList>
        <Memo>
          <Offset>5471</Offset>
          <Text>THE PRESIDENT APPEARS ON THE HALL.</Text>
        </Memo>
      </MemoList>
    </ClipMetadata>
  </ClipContent>
</P2Main>
```

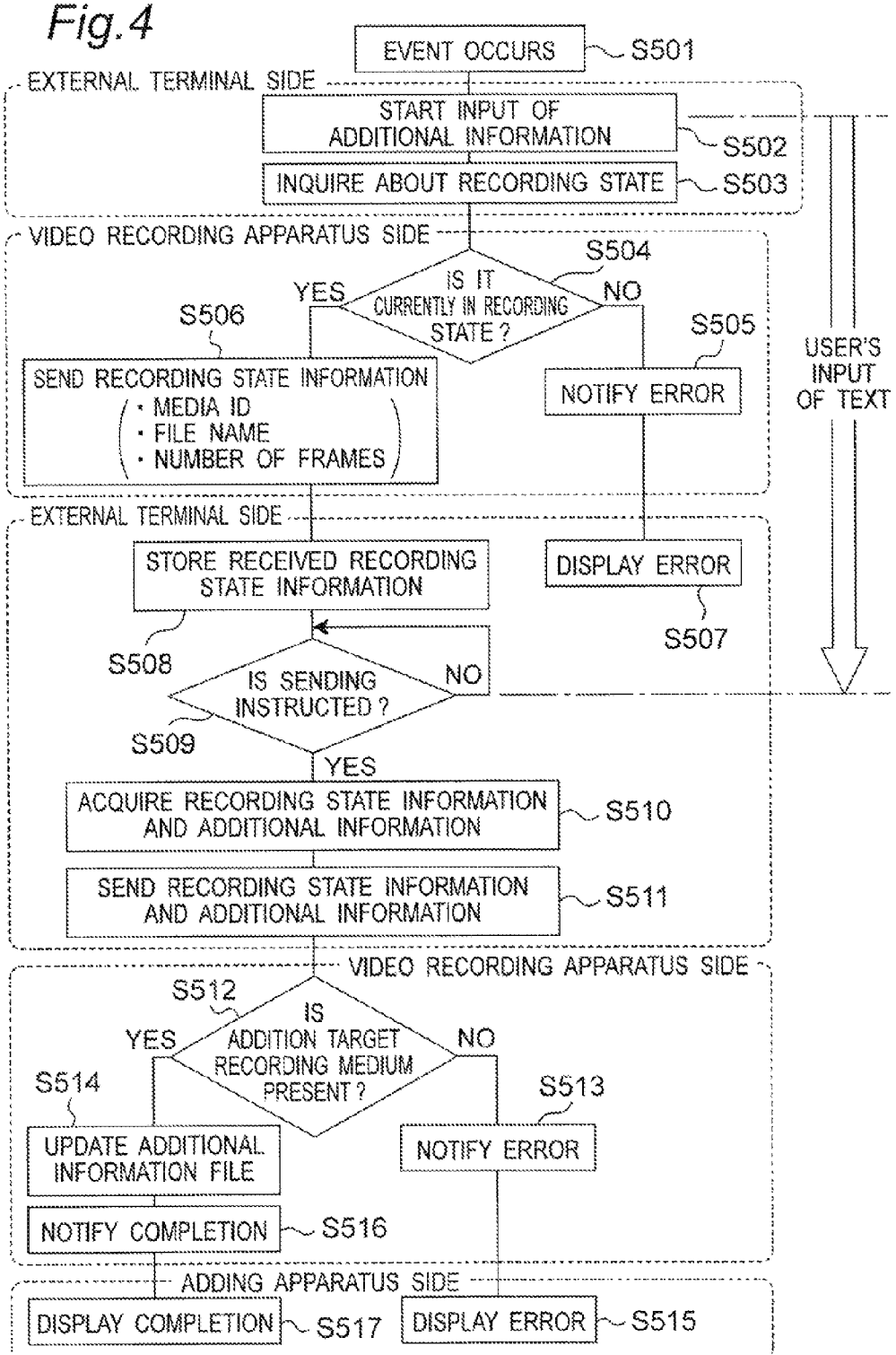

```
<Meta>
  <Query>Status</Query>
</Meta>
```

(B)

```
<Meta>
  <Response>
    <media>10000000</media>
    <File>0001.mxf</File>
    <Frame>5471</Frame>
  </Response>
</Meta>
```

(C)

```
<Meta>
  <Response>
    <Error>Camcoder Status is Still</Error>
  </Response>
</Meta>
```

(D)

```
<Meta>
  <Add>
    <media>10000000</media>
    <File>0001.mxf</File>
    <Frame>5471</Frame>
    <Text>THE PRESIDENT APPEARS ON THE HALL.</Text>
  </Add>
</Meta>
```

(E)

```
<Meta>
  <Response>
    <OK/>
  </Response>
</Meta>
```

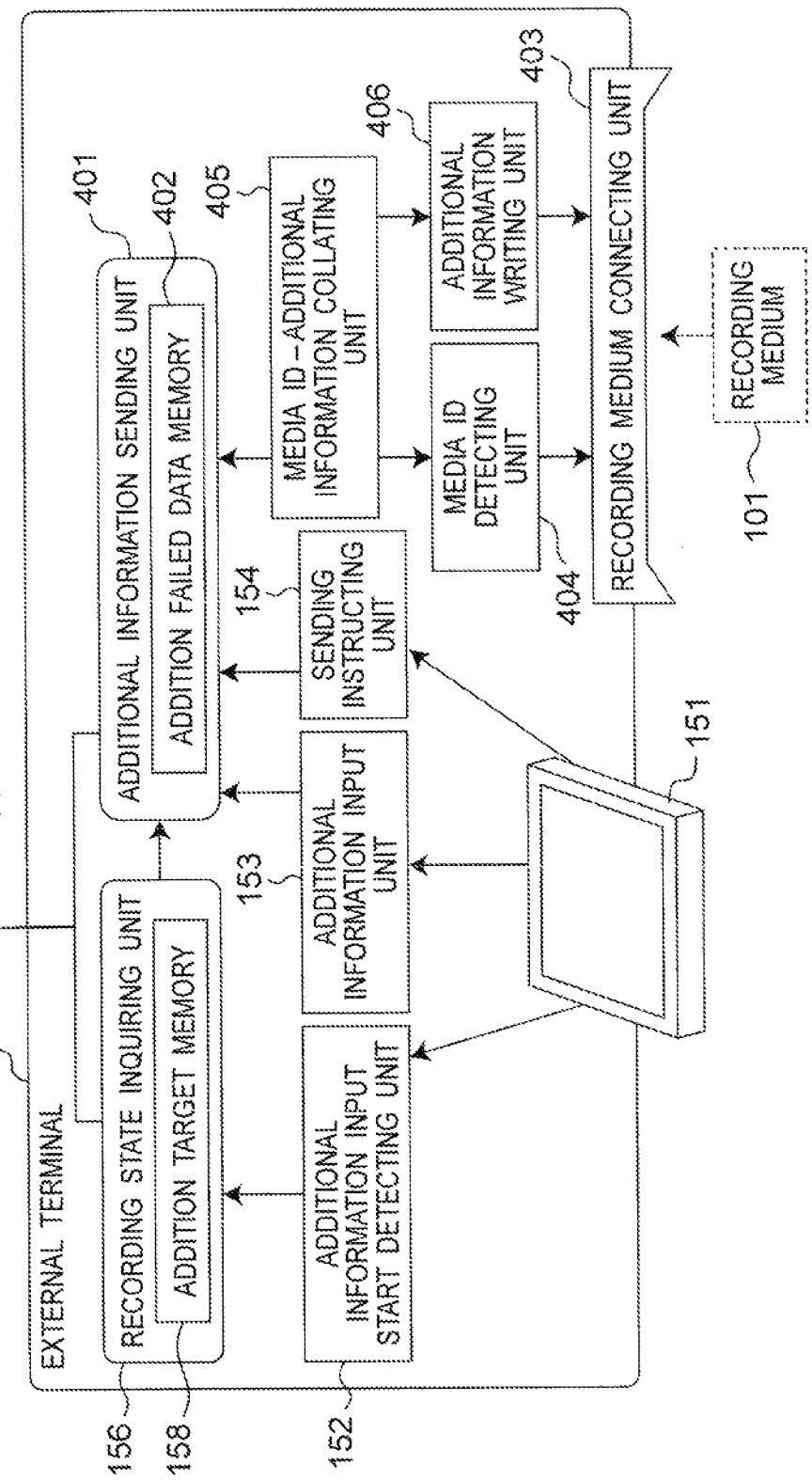

Fig.8

| | MEDIA ID | FILE NAME | OFFSET | ADDITIONAL INFORMATION |
|---|---|---|---|---|
| 1 | 10000000 | 0001.mxf | 471 FRAMES | "THE PRESIDENT APPEARS ON THE HALL." |
| 2 | 0015f6a0 | 0005.mxf | 129 FRAMES | "THE AUDIENCE WELCOMES THE PRESIDENT WITH A CLAPPING OF HANDS." |

VIDEO RECORDING APPARATUS AND EXTERNAL TERMINAL

BACKGROUND ART

1. Technical Field

The present invention relates to a video recording apparatus such as a camera recorder and an apparatus for inputting additional information to a recording medium associated with the video recording apparatus.

2. Related Art

In recent years, video recording apparatuses, that do not record videos linearly in tapes but record videos as files to recording media such as semiconductor memories, appear in the market (for example, refer to JP-A-7-67066).

In the case of such video recording apparatuses that record videos as files, the apparatuses can record additional information relating to shoot videos to recording media. Further, JP-A-2007-082088 discloses a video recording apparatus that records additional information relating to a video with the additional information being further related to a time axis of the video. Concretely, this video recording apparatus has a metadata input button as an additional information input unit to be operated by user's action. The metadata input button includes three buttons, and is provided in a side surface of a camera recorder. For example, a first button of the three buttons is for registering an important scene, a second button is for enabling a button operation or switching a mode into a character input mode, and a third button is for canceling registration. When the metadata input button is pressed down at an important scene during the shooting, additional information such as a mark or a text can be added to the important shot scene. As to input of text information, the video recording apparatus recognizes a video and a sound and can automatically generate a text corresponding to the video and the sound.

However, the additional information input unit described in JP-A-2007-082088 requests a camera operator to perform complicated operations other than a shooting operation (adjustment of a focus and a diaphragm, a screen structure, and the like). In other words, it is very difficult for the camera operator to efficiently perform the shooting operation and input additional information in parallel.

In recent years, mobile terminals such as cellular telephones and portable music players having a highly-operable character input unit and a wireless connecting unit such as a wireless LAN are easily obtainable.

It is considered that such mobile terminals are used as the character input units for inputting additional information such as texts. Such a constitution enables additional information to be input to recording media in video recording apparatuses remotely via wireless connection. Particularly in a professional video production where a plurality of people collectively produce videos, two people can be in charge of photographing and inputting of additional information, respectively. As a result, the respective operations can be easily performed in parallel.

When a portable terminal to be used for inputting additional information has the above highly operable character input unit, it is considered that input of more detailed information than conventional one as additional information is demanded. That is, this demand is such that texts with large wordage are input as additional information.

However, it takes a proper time for a person who inputs additional information to input a text with large wordage through the character input unit. Therefore, when such additional information is tried to be related to the time axis of video data, it is considered that the following problem arises.

When the person who inputs additional information starts to input a text describing event contents according to occurrence of an event and completes the input, the text information is sent to the video recording apparatus. When the video recording apparatus receives the text information, considerable time already passes after the occurrence of the event. As a result, when the additional information is related to video data at the reception timing, a difference is generated between true time at which the person who inputs the additional information desires to add additional information and time at which the additional information is actually related to the video data. Depending on an amount of text, the difference is considered to be about from a several seconds to several tens of seconds at a general character input speed. Therefore, at the time of editing the video, an editor should review the video around the time at which the additional information is related and should search and estimate an added place that is truly intended by the person who inputs additional information.

SUMMARY

The present invention is devised in view the above problem, and an object thereof is to provide a video recording apparatus in which when a video is recorded as a file to a recording medium and additional information related to a time axis of video data is recorded by using an external terminal, the additional information can be related to a position on the time axis intended by a person who inputs additional information.

To achieve above object, in the first aspect, a video recording apparatus capable of recording video data is provided. The video recording apparatus comprising: a communication unit operable to communicate with an external terminal; a recording position storage unit operable to store latest information representing a recording position of video data currently being recorded; and a recording state management unit operable to send the information representing the recording position to the external terminal via the communication unit, when receiving a predetermined signal from the external terminal via the communication unit.

In the second aspect, an external terminal having a communication unit capable of communicating with a video recording apparatus is provided. The external terminal comprising: an input unit operable to input additional information from a user; an input start detecting unit operable to detect start of the input of the additional information to the input unit; and a recording state inquiring unit operable to inquire of the video recording apparatus and acquire information representing a recording position in video data currently being recorded by the video recording apparatus via the communication unit, when the input start detecting unit detects the start of the input of the additional information.

The video recording apparatus stores latest information representing a recording position of video data currently being recorded. When the video recording apparatus receives a predetermined signal from the external terminal via the communication unit, the video recording apparatus sends the information representing the recording position to the external terminal via the communication unit. With this the video recording apparatus can relate additional information related to a predetermined position of the video data to information representing the recording position of the video data to which the additional information is to be added Therefore, when a video is recorded as a file to a recording medium provided to the video recording apparatus and the additional information related to the time axis of the video data is recorded by using the external terminal, even a text with long additional information and a lot of characters can be related to a position on the time axis intended by the person who inputs additional information in the video data. Additionally, at an editing step after the shooting, a desired video can be quickly searched for and cued by using the recording position information and the additional information, thereby greatly improving efficiency of the works in the video production.

BRIEF DESCRIPTION OF DRAWINGS

FIG. 3A is a diagram showing an example of contents of the additional information file.

FIG. 3B is a diagram showing an example of contents of the additional information file.

FIG. 4 is a flowchart showing operations of the video recording apparatus and the external terminal according to the first embodiment.

FIG. 5 is a diagram showing examples of communication contents to be used between devices.

FIG. 6 is a diagram showing the external terminal according to a second embodiment.

FIG. 8 is a diagram showing contents of an addition failed data memory.

DETAILED DESCRIPTION

First Embodiment

1. System Constitution

Figure 1A:
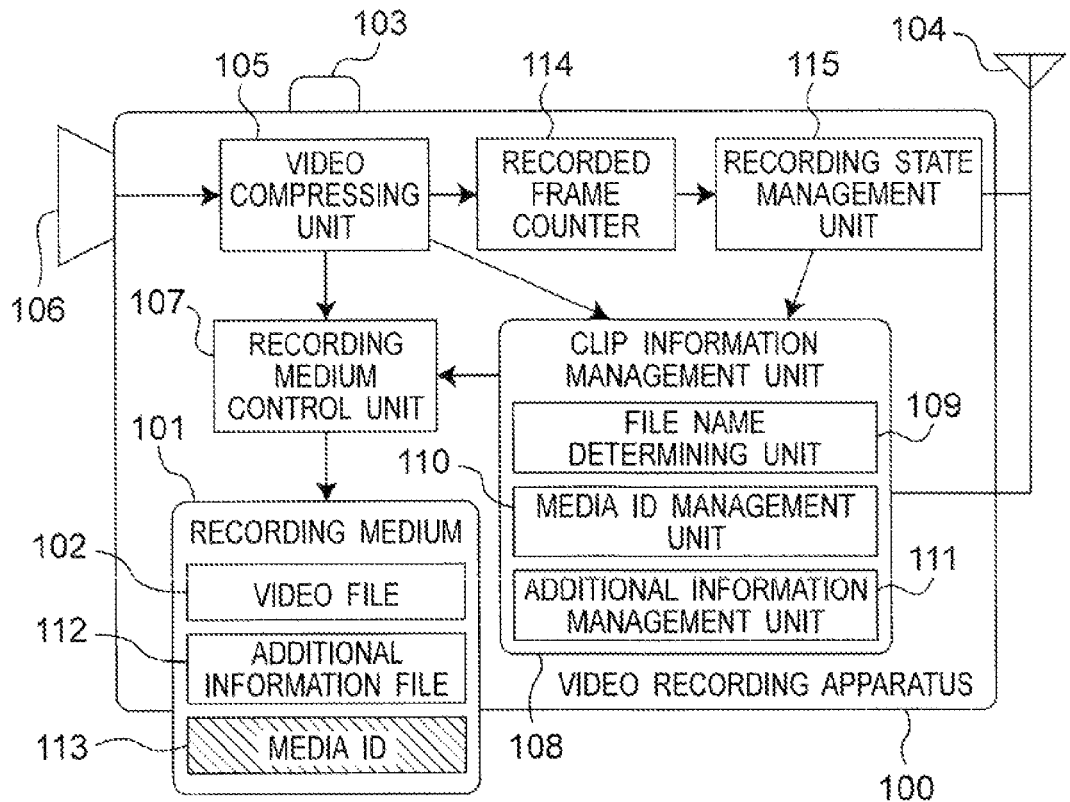
FIGS. 1A and 1B are diagrams showing a video recording apparatus and an external terminal according to a first embodiment.
Figure 1B:
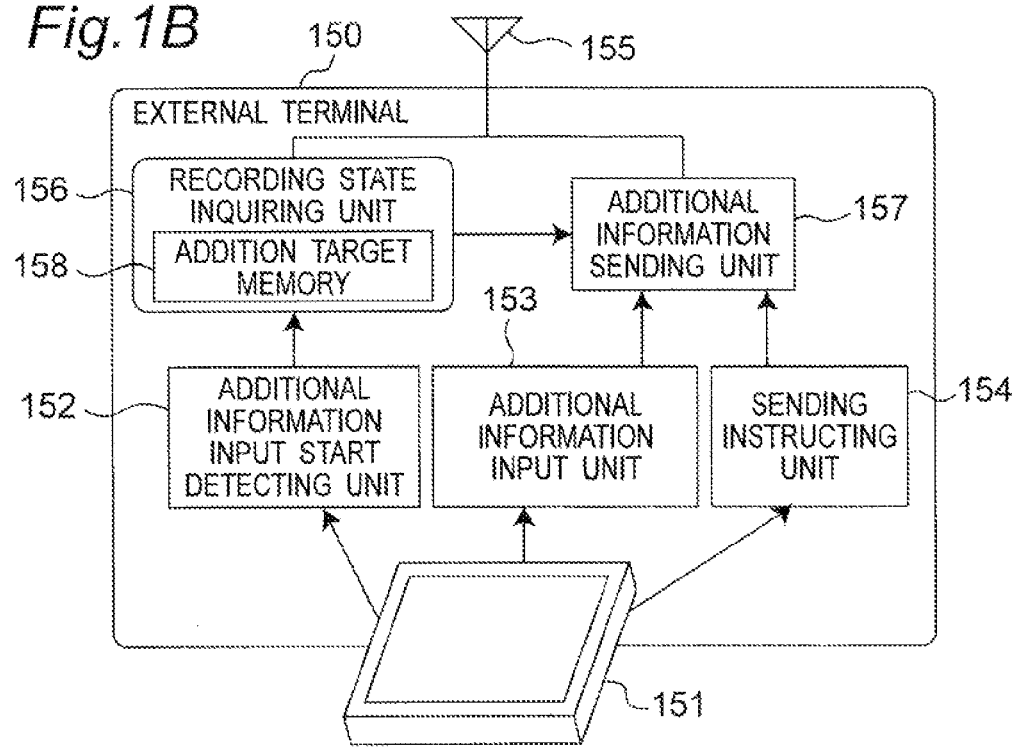

FIGS. 1A and 1B are block diagrams showing constitutions of a video recording apparatus and an external terminal according to a first embodiment.

FIG. 1A shows the block diagram of the video recording apparatus according to the first embodiment.

The video recording apparatus 100 has a imaging unit 106, a video compressing unit 105, a recording medium control unit 107, a recorded frame number counter 114, a recording state management unit 115, a clip information management unit 108, a recording start/end accepting unit 103, and a wireless communication unit 104. The video recording apparatus 100 writes a video file 102 in an insertable recording medium 101 so as to record a video. When a user instructs the start of video recording via the recording start/end accepting unit 103, the video compressing unit 105 compresses uncompressed moving image data output by the imaging unit 106 into a moving image format such as MPEG-2 (ISO/IEC 13818) or DV (IEC 61834). The video recording apparatus 100, then, records the compressed data as the video file 102 to the recording medium 101 via the recording medium control unit 107. The recording start/end accepting unit 103 is, for example, a recording start button of a camera recorder. As the recording medium 101, random-accessible media such as semiconductor memories and optical disks are used. The recording medium control unit 107 manages a layout of files on the recording medium 101 using a FAT file system (ISO/IEC 9293) or the like. The clip information management unit 108 has a file name determining unit 109, a media ID management unit 110, and an additional information management unit 111. The recording medium control unit 107 inquires at the file name determining unit 109 in the clip information management unit 108 about a name of a file to be used when determining a file name of the video file 102. The file name determining unit 109 gives unique names to respective video files so that the video files present in the recording medium 101 have serial numbers of a creating order.

At the same time when the video recording apparatus 100 starts the recording of the video, the additional information management unit 111 creates additional information about the video file 102 in the recording medium 101 as an additional information file 112 to the recording medium 101 where the video file 102 is recorded.

Figure 2:
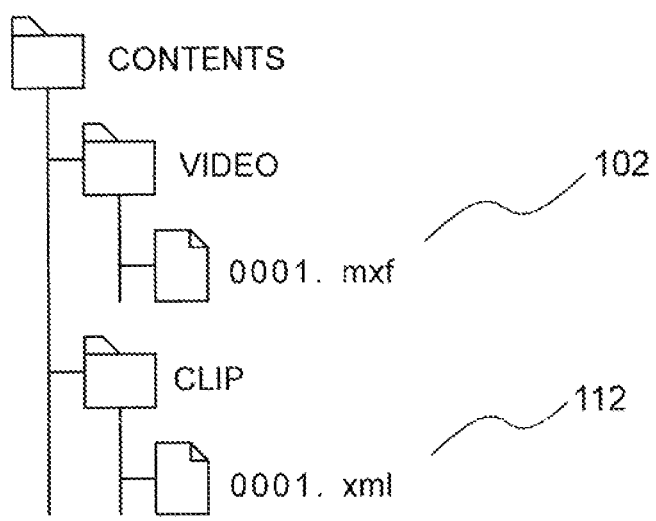
FIG. 2 is a diagram showing a layout of a video file and an additional information file on a recording medium.

FIG. 2 shows constitutional examples of the video file 102 and the additional information file 112 in the recording medium 101. In FIG. 2, the same components as those in FIGS. 1A and 1B are denoted by the same reference numerals.

As shown in FIG. 2, a contents directory is created in a route directory in the recording medium 101, and all data to be written by the video recording apparatus 100 are written below this directory. A video directory and a clip directory are created below the contents directory. The video file 102 is recorded below the video directory, and the additional information file 112 is recorded below the clip directory. In this example, the name of the video file 102 is "0001.mxf", and it is composed of a serial number "0001" of video files in the recording medium 101 and an extension "mxf" (Material Exchange Format [SMPTE-377M]) representing a file type. Since the name of the additional information file 112 is "0001.xml", the corresponding video file 102 can be easily recognized from its file name. That is, the file name is composed of the serial number "0001" that is same as the corresponding video file 102 and the extension "xml" (Extensible Markup Language [JIS X 4159: 2002]) representing the file type of the additional information.

FIG. 3A shows an example of the additional file 112 created along with video recording of the video recording apparatus according to the first embodiment. In this example, the additional information 112 is described in an XML format. In this case, the file name of the video file 102 is represented by a <ClipName> tag, a length of the video file 102 is described by a <Duration> tag along with the <ClipName> tag, and a parameter of the video file 102 is enumerated by an <EssenceList> tag. As a unit of the length of the video described by Duration, a frame is used in this example. In the <EssenceList> tag, a frame rate of the video is described by using a <Codec> tag, and a starting time code of the video file 102 is described by using a <StartTimecode> tag. In this example, the video length of the video file 0001.mxf is 1064 frames, a frame frequency is 59.94 frames/sec, and the starting time code is 05:33:33:12.

Further, the clip information management unit 108 reads a media ID 113 of the recording medium 101 at a stage that the recording medium 101 is connected to the video recording apparatus 100, and stores the media ID 113 in the media ID management unit 110. The media ID 113 may be a number string or a character string that can uniquely specify the recording medium 101. The media ID 113 may be embedded to the recording medium 101 in a hardware manner (for example, production serial number), or may be written into a management area of a file system on the recording medium 101 (for example, a volume ID of an FAT file system).

The recorded frame number counter 114 acquires a number of frames written as the video file 102 to the recording medium 101 by the video recording apparatus 100 from the video compressing unit 105, and stores the number of frames. The number of frames stored by the recorded frame number counter 114 is started to be counted just when the recording start/end accepting unit 103 instructs the start of recording of moving images, sequentially counted up, and is reset to 0 just when the end of the recording of moving images is instructed.

The recording state management unit 115 always acquires the file names of the video file 102 currently being recorded from the file name determining unit 109, the media ID of the recording medium 101 from the media ID management unit 110, and the number of recorded frames from the recorded frame number counter 114. As a result, the recording state management unit 115 stores a location and a length of the video data recorded by the video recording apparatus 100 at real time. The recording state management unit 115 is connected to the wireless communication unit 104, and can wirelessly communicate with the external terminal 150.

FIG. 1B shows a block diagram of the external terminal 150 according to the first embodiment.

The external terminal 150 has a touch panel 151, an additional information input start detecting unit 152, an additional information input unit 153, and a sending instructing unit 154. The touch panel 151 has a role of a user interface for the additional information input start detecting unit 152, the additional information input unit 153, and the sending instructing unit 154. The additional information input unit 153 acquires and stores contents in a text input area displayed on the touch panel 151. The additional information input start detecting unit 152 detects input of a first character into the text input area and clicking of an "input start" button displayed on the touch panel 151. The sending instructing unit 154 detects clicking of a "send" button displayed on the touch panel 151. The touch panel 151 is one example of the user interface, and the display area and the input unit may be separated as long as the touch panel realizes the interface for the additional information input unit 153, the additional information input start detecting unit 152, and the sending instructing unit 154.

The external terminal 150 further has a wirelessly communication unit 155, and can wirelessly communicate with the video recording apparatus 100. Further, the external terminal 150 has a recording state inquiring unit 156 and an additional information sending unit 157. The recording state inquiring unit 156 has an addition target memory 158 for storing information received from the video recording apparatus 100 via the wireless communication unit 155.

In the first embodiment, the following system is assumed. With this system, the user with the external terminal 150 inputs an event that occurs on a target currently shot and a text describing a shooting target itself (hereinafter, suitably referred to as "additional information") at real time in vicinity where a camera operator performs shooting using the video recording apparatus 100. In the following description, a state that additional information is to be input is called "occurrence of an event" for convenience. As the wireless communication between the video recording apparatus 100 and the external terminal 150, use of Ad-Hoc communication defined by general wireless LAN (IEEE802.11b or the like) is assumed, but any system may be used as long as it can receive and send information therebetween.

2. Operation

A method for giving the additional information related to the time axis of the video file 102 being currently recorded by the video recording apparatus 100 from the external terminal 150 is described in detail below with reference to a flowchart of FIG. 4.

When an event occurs (S501), the user operates the touch panel 151 of the external terminal 150 to start input of additional information. The additional information input start detecting unit 152 detects the user's input of the additional information. In this detecting method, clicking of an "input start" button displayed on the touch panel 151 may be detected, or the additional information input start detecting unit 152 may automatically detect the start of writing of characters into the text input area displayed on the touch panel 151.

When the start of the input of the additional information is detected (S502), the additional information input start detecting unit 152 notifies the recording state inquiring unit 156 of the detection. The recording state inquiring unit 156 inquires at the video recording apparatus 100 about the recording state (S503). The recording state inquiring unit 156 sends a character string, for example, shown in FIG. 5(A) to the video recording apparatus 100 using the wireless communication via the wireless communication unit 155 so as to inquire about the recording state (S503). As a protocol at the time of the wireless communication, for example, TCP/IP (RFC793/RFC791) can be used. The same holds true for the following wireless communication.

When the video recording apparatus 100 receives the inquiry about the recording state via the wireless communication unit 104, the recording state management unit 115 determines whether or not the video recording apparatus 100 is currently recording a video based on whether or not the recorded frame number counter 114 is activated (S504). When the video recording apparatus 100 is not performing the recording operation, the recording state management unit 115 notifies the external terminal 150 of an error (S505). The recording state management unit 115 sends a character string, for example, such as that shown in FIG. 5(C) as the error notification to the external terminal through the wireless communication. When the external terminal 150 receives the error notification, it displays a warning text (error display) on the touch panel 151 (S507), and notifies the user of the impossibility of giving of additional information.

On the other hand, when the determination is made that the video recording apparatus 100 is performing the recording operation, the recording state management unit 115 sends information about a recording state and an addition target at that time (hereinafter, referred to as "recording state information") to the external terminal 150 (S506). The recording state information includes "media ID name" of the media where a video is recorded, "file name" of the video being recorded, and "a number of frames (offset)" from the start of recording. The number of frames from the start of recording is acquired from the recorded frame number counter 114. The recording state information is returned as a character string, for example, such as that shown in FIG. 5(B) through the wireless communication. FIG. 5(B) shows text data for sending information about a state such that a 5471st frame of the video file "0001.mxf" is being recorded to a recording medium with media ID 10000000 at the time of inquiry about the recording state.

When the external terminal 150 receives the recording state information from the video recording apparatus 100, the external terminal 150 stores the received information in an addition target memory 158 (S508), and thereafter stands by until the user instructs sending of an input text via the sending instructing unit 154 (S509).

At the time when the user starts to input the additional information, the external terminal 150 acquires the recording state information at the time of the start of recording from the video recording apparatus 100 in advance independently from a step of sending a text from the user. As a result, the real-time giving of additional information to an intended position on the time axis is enabled regardless of the time required for user's input of additional information (text input).

After the start of inputting additional information (S502), the user inputs additional information (text) to be given to the time axis of the video file 102 via the touch panel 151 or the like. The operation for inputting additional information and the communication of the recording state information may be performed completely in parallel. The contents of text data input by the user are successively stored to the additional information input unit 153 in the external terminal 150. When the input of the text data is ended, the user performs actions such as clicking the "send" button on the touch panel 151 so as to instruct the sending instructing unit 154 to start the sending operation.

When the sending instruction is detected in step S509, the sending instructing unit 154 activates the additional information sending unit 157. The additional information sending unit 157 acquires the additional information input by the user from the additional information input unit 153. The additional information sending unit 157 acquires the recording state information that is received from the video recording apparatus 100 and stored when the input of the additional information is started, from the addition target memory 158 (S510). The additional information sending unit 157 relates the additional information to the recording state information so as to send the related information to the video recording apparatus 100 via the wireless communication unit 155 (S511). For example, a character string such as that shown in FIG. 5(D) is sent via the wireless communication.

When the video recording apparatus 100 receives the additional information and the recording state information from the external terminal 150, the video recording apparatus 100 determines whether or not a recording medium to which the additional information is to be added, serving as the addition target, is connected to the video recording apparatus 100 (S512). Concretely, the video recording apparatus 100 compares the media ID name in the recording state information with the media ID name of the recording medium 101 currently connected to the video recording apparatus 100, and checks whether the recording media match with each other (S512). When the recording media do not match, the video recording apparatus 100 notifies the external terminal 150 of occurrence of an error via the wireless communication unit 104 (S513), and the external terminal 150 notifies the user of the occurrence of the error in a manner such that a warning text (error display) is displayed on the touch panel (S515). The operations from steps S513 to S515 can be realized by the same operations as those from steps S505 to S507 described above.

When the recording media match with each other, the clip information management unit 110 updates the additional information file 112 related to the target video file 102, so as to give the received additional information thereto (S514). For example, the clip information management unit 110 rewrites the additional information file 112 as shown in FIG. 3B so as to add the additional information related to the time axis of the video file 102.

In FIG. 3B, in comparison with the contents of the additional information file 112 just after the start of recording (FIG. 3A), a <MemoList> tag and a portion thereafter are added. A <Memo> tag is present after the <MemoList> tag. An <Offset> tag and a <Text> tag are present after the <Memo> tag. Contents of <Text> are the additional information acquired from the external terminal 150, namely, the contents of the additional information (text) input by the user. Contents of the <Offset> are frame number information in the recording state information acquired from the external terminal 150, namely, a position related to the contents of <Text>, more specifically, information about what number of frame from the start frame of the video file 102, namely, a number of frames after the start of the recording.

When the additional information file 112 is updated in step S514, the video recording apparatus 100 notifies the external terminal 150 of the completion of the process (S156). For example, the video recording apparatus 100 sends a character string such as that shown in FIG. 5(E) through the wireless communication. When the external terminal 150 receives the completion notification in step S516, the external terminal 150 displays the completion on the touch panel 151 so as to notify the user of the completion of the process for relating the additional information to the video file 102 (S517).

3. Conclusion

As described above, the video recording apparatus 100 according to the first embodiment records latest information representing a recording position of video data currently being recorded, and when the external terminal 150 inquires about the recording state via the wireless communication unit 104 (when a predetermined signal is received), the video recording apparatus 100 sends the information representing the recording position to the external terminal 150 via the wireless communication unit 104. When the video recording apparatus 100 receives the additional information and the information representing the recording position of the video data to which the additional information is to be added from the external terminal 150 via the wireless communication unit 101, the video recording apparatus 100 relates the received additional information to the video data based on the received information representing the recording position so as to record the video data to the recording medium 101. Therefore, even when the additional information is a long text with many characters, the additional information can be related to the position on the time axis intended by the person who inputs additional information in the video data. Additionally, at the editing step after the shooting, a desired video can be quickly searched and cued by using the recording position information and the additional information. As a result, the efficiency of the works in the video production can be greatly improved.

In the first embodiment, the video recording apparatus 100 and the external terminal 150 can send/receive various information through the wireless communication, but may be used for cable communication as long as it can realize electronic communication between these apparatuses.

The timing at which the additional information file 112 related to the video file 102 is created is simultaneous with the start of recording a video by the video recording apparatus 100. However, this timing may be any timing after the start of the recording. For example, the timing may be timing instructed by the user, such as the end of the shooting operation.

In the first embodiment, the video file 102 and the additional information file 112 are recorded in the same recording medium 101, but may be recorded in different recording media. In order to produce the effect of the first embodiment, locations of the respective files do not matter as long as the video file 102 and the additional information file 112 are definitely related to each other by using the file name of the additional information file 112 and the described contents in the additional information file 112.

In the first embodiment, the file format of the video file 102 is MXF and the file format of the additional information file 112 is XML, but they are defined for convenience of the description, and thus this does not limit the file format to be adopted in the first embodiment.

In the first embodiment, the number of frames after the start of the video recording is used as the information representing the recording position at the time when the video recording apparatus 100 receives the inquiry about the recording state, but elapsed time from the start of the video recording may be used. In this case, instead of the recorded frame number counter 114, a unit for counting the elapsed time from the start of the video recording may be provided.

Second Embodiment

FIG. 6 is a block diagram showing a constitution of an external terminal 400 according to a second embodiment. The external terminal 400 according to the second embodiment is an example of the external terminal that is provided with a countermeasure against the case where a recording medium as an addition target is not present at the time of reflecting additional information on the side of the video recording apparatus 100 (S513 in FIG. 4 in the first embodiment). The video recording apparatus to be a partner of communication is same as the video recording apparatus 100 disclosed in the first embodiment.

The same numbers are used for the same block as the external terminal 150 according to the first embodiment.

An additional information sending unit 401 of the external terminal 400 according to the second embodiment has an addition failed data memory 402. The external terminal 400 has a recording medium connecting unit 403, and the recording medium connecting unit 403 can connect the recording medium 101 removed from the video recording apparatus 100 to the external terminal 400. The external terminal 400 has a media ID detecting unit 404, a media ID—additional information collating unit 405, and an additional information writing unit 406. The media ID detecting unit 404 reads the media ID of the recording medium 101 connected to the recording medium connecting unit 403. The media ID—additional information collating unit 405 compares the contents of the addition failed data memory 402 with the detected contents of the media ID detecting unit 404. The additional information writing unit 406 reflects the contents in the addition failed data memory 402 on the addition information file 112 in the recording medium 101.

An operation of the external terminal 400 according to the second embodiment is described below with reference to a flowchart of FIG. 7. Also in the second embodiment, the same steps as steps S501 to 512, S514, S516 and S517 in the flowchart shown in FIG. 4 in the first embodiment are performed. However, these steps are omitted in FIG. 7, and only a process after step S513 is shown.

When the external terminal 400 receives the error notification representing that a recording medium as an addition target is not present from the video recording apparatus 100, the external terminal 400 saves the contents in the addition target memory 158 and the contents in the additional information input unit 153 to the addition failed data memory 402 so as to notify the user of the failure of the addition of the additional information (S601).

The addition failed data memory 402 stores the recording state information acquired in step S510 with a table format shown in FIG. 8. Specifically, the addition failed data memory 402 stores information set including "media ID", "file name", "offset" and "additional information" as one entry thereto. The offset means the number of frames from the start of recording.

After step S601, the external terminal 400 waits for connection of the recording medium 100 to the recording medium connecting unit 403 (S602). When a new even occurs during the waiting state, the input of additional information may be accepted by the method shown in FIGS. 4 and 7.

When the recording medium 101 is connected to the recording medium connecting unit 403, the media ID detecting unit 404 acquires the media ID from the recording medium 101 (S603). The media ID—additional information collating unit 405 searches the information table of the addition failed data memory 402 for an entry whose media ID matches with the media ID acquired from the media ID detecting unit 404 as a key (S604). When that entry is not present, the sequence returns to step S602.

When the entry that matches with the media ID is present, the media ID—additional information collating unit 405 changes (updates) the additional information file 112 in the recording medium 101 whose file name matches, in such a manner that "offset" and "additional information" are additionally described (S605). The contents of the additional information file in this case are the same as those in FIG. 3B described in the first embodiment.

When updating the additional information file 112, the media ID—additional information collating unit 405 deletes the corresponding entry from the addition failed data memory 402 (S606), and notifies the user of the completion of the process (S607). The completion of the process is notified by, for example, displaying a message about the completion on the touch panel 151.

As described above, the addition of additional information is failed because when the video recording apparatus 100 tries to add the additional information, the recoding medium 101 is already detached. Even in this case, with the external terminal 400 according to the second embodiment, the additional information can be related to a position on the time axis in a video intended by the user by connecting the corresponding recording medium to the external terminal 400. As a result, the working efficiency at the time of using the additional information at the editing step or the like after shooting can be improved.

In the second embodiment, the external terminal 400 automatically detects insertion of the recording medium 101 in step S602. However, the insertion of the recording medium 101 does not have to be always detected automatically when the sequence goes to next step, and the user may expressly specify to proceed to next step. For example, a "reflect" button is displayed on the touch panel 151, and when the "reflect" button is clicked, the sequence goes to a step of acquiring the media ID (S603).

Figure 7:
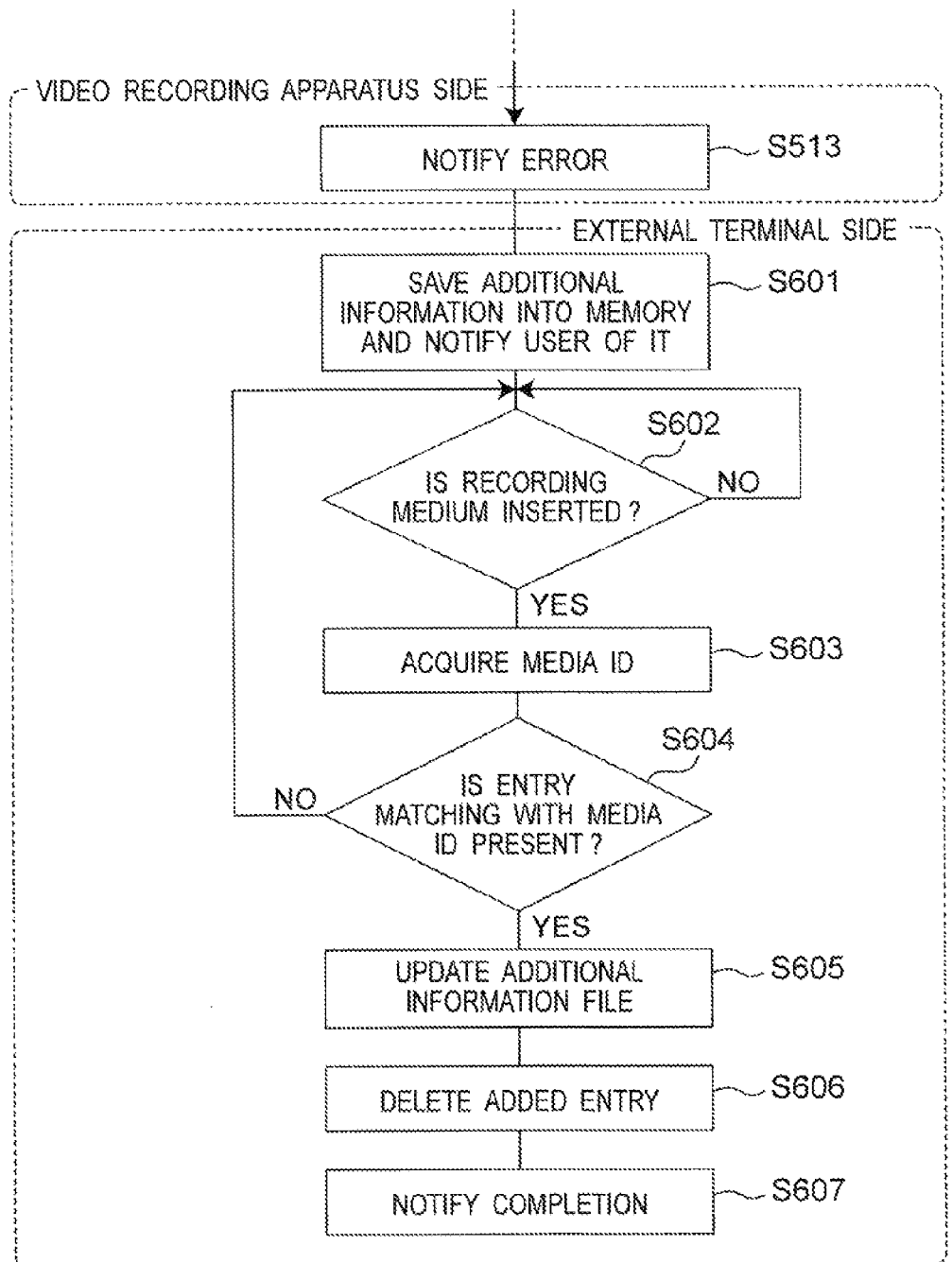
FIG. 7 is a flowchart showing an operation of the external terminal according to the second embodiment.

In FIG. 7, the operations after step S601 are described as the case of the operations after the error notification such that a recording medium as an addition target is not present is received from the video recording apparatus 100 in step S513. However, the operations after step S601 can be applied as the operations in the case where communication is failed when the external terminal 400 tries to perform electronic communication with the video recording apparatus 100 in step S511 in FIG. 4.

As described above, a difference is generated between the time at which additional information is intended to be added and the time at which the additional information is actually sent to the video recording apparatus 100. As a result, when the recording medium 101 to be used by the video recording apparatus 100 is a removable medium such as a semiconductor memory card or an optical disk, the recording medium where a video data file desired to be related to the additional information is recorded is possibly already removed from the video recording apparatus at a stage that the additional information is sent to the video recording apparatus 100. In this case, the information input by the person who inputs additional information is not reflected on the intended video data at all. However in the second embodiment, even in this case, when the recording medium 101 is connected to the external terminal 400, the additional information can be recorded in the recording medium 101.

Third Embodiment

Figure 9:
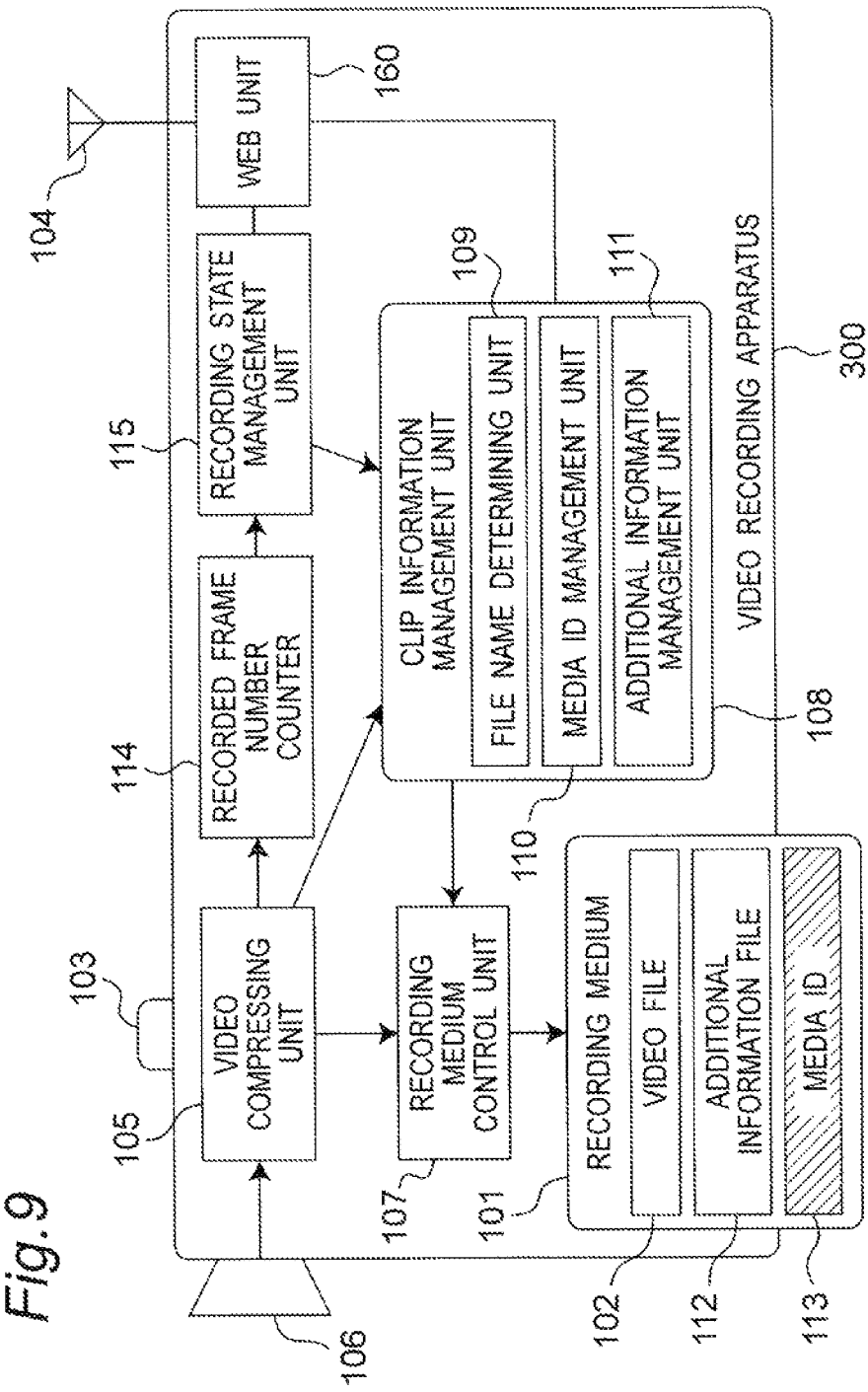
FIG. 9 is a diagram showing a video recording apparatus according to a third embodiment.

FIG. 9 is a block diagram showing a constitution of a video recording apparatus 300 according to a third embodiment. In the third embodiment, the video recording apparatus 300 is provided with a web unit 160 between the recording state management unit 115 and the clip information management unit 108 and the wireless communication unit 104. The web unit 160 has a function as a web server, and constitutes an interface accessing to the video recording apparatus 300 from the external terminal. The other parts are the same as those of the video recording apparatus 100 disclosed in the first embodiment.

The external terminal 150 is mounted with a web browser function. The additional information input start detecting unit 152, the additional information input unit 153, the sending instructing unit 154, the recording state inquiring unit 156, and the additional information sending unit 157 of the external terminal 150 are constituted by using the web browser function. The other parts are the same as those of the external terminal 150 disclosed in the first embodiment.

Figure 10:
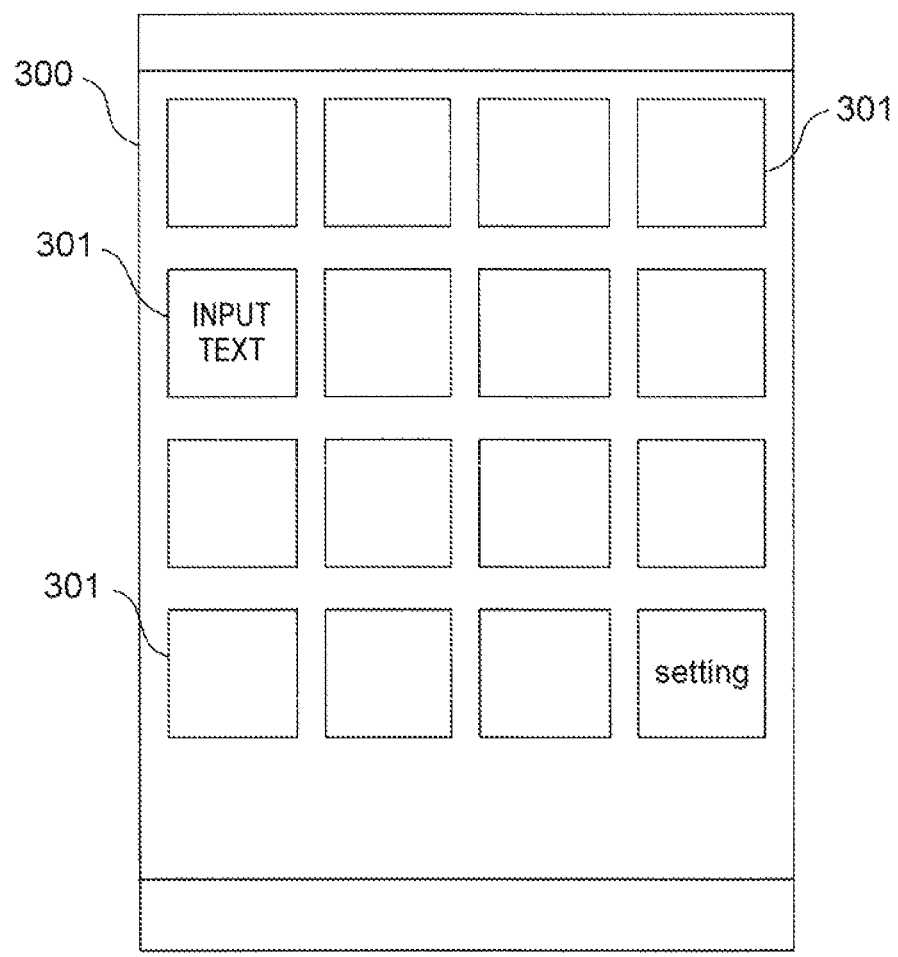
FIG. 10 is a diagram showing an example of a display screen of the external terminal (function selecting screen).
Figure 11:
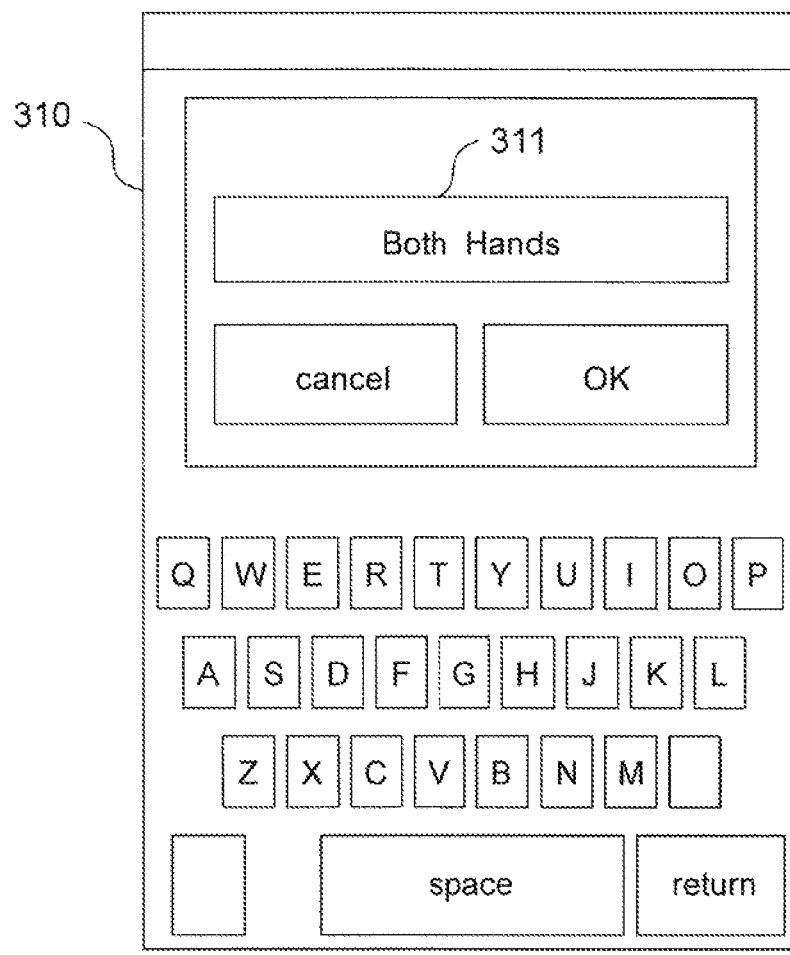
FIG. 11 is a diagram showing an example of a display screen of the external terminal (additional information input screen).

FIG. 10 shows a function selecting screen 300 to be displayed on the external terminal 150 when accessing to the video recording apparatus 300 using the web browser function of the external terminal 150. A plurality of function selecting buttons 301 is arranged on the function selecting screen 300. The button "Input TEXT" of these buttons is for activating an additional information input function. When the "Input TEXT" button is touched, the start of the additional information input is detected (additional information input start detecting unit 152), and a text input screen 310 shown in FIG. 11 is displayed. A keyboard section (additional information input unit 153) is arranged below the text input screen 310. A text display section 311 for displaying characters input by touching the keyboard section is arranged above the additional information input screen 310. In the example of FIG. 11, "Both Hands" is displayed on the text display section 311. A "cancel" button and an "OK" button are arranged below the text display section 311. The "cancel" button is for clearing input additional information (text). The "OK" button is for defining the input additional information and instructing sending (sending instructing unit 154). When the "OK" button is touched, the input additional information is defined, and the input additional information is sent.

According to the third embodiment, various terminals mounted with the web browser can be used as the external terminal for the video recording apparatus.

In the above embodiments, the video compressing unit 105, the recorded frame number counter 114, the recording state management unit 115, the recording medium control unit 107, and the clip information management unit 108 on the side of the video recording apparatus 100, the recording state inquiring unit 156, the additional information sending unit 157, the additional information input start detecting unit 152, the additional information input unit 153, the sending instructing unit 154, the media ID—additional information collating unit 405, the media ID detecting unit 404, the additional information writing unit 406, and the web unit 160 on the side of the external terminal 150 can be structured by any of hardware or programs.

The video recording apparatus and the external terminal of the above embodiments enable additional information to be given to an intended location on a time axis of video data. For this reason, when a non-linear video editing software or the like for supporting search and cue of video data based on the additional information is used, the video editing operation can be performed very efficiently.

What is claimed is:

1. An external terminal having a communication unit capable of communicating with a video recording apparatus, the external terminal comprising:
an input unit operable to input additional information from a user;
an input start detecting unit operable to detect start of the input of the additional information to the input unit;
a recording state inquiring unit operable to inquire of the video recording apparatus and acquire timing information representing a recording position in video data currently being recorded by the video recording apparatus via the communication unit, when the input start detecting unit detects the start of the input of the additional information;
a first storage unit operable to store the timing information representing the recording position received from the video recording apparatus in response to the inquiry; and
an additional information sending unit operable to send the additional information input via the input unit and the timing information representing the recording position stored in the first storage unit to the video recording apparatus via the communication unit, when the user completes the input of the additional information.

2. The external terminal according to claim 1, wherein the timing information representing the recording position is information about a number of frames of the video data recorded from start of the recording by the video recording apparatus.

3. The external terminal according to claim 1, wherein the timing information representing the recording position is information about elapsed time from start of the recording by the video recording apparatus.

4. The external terminal according to claim 1, wherein the recording state inquiring unit inquires about a file name of the video file recorded by the video recording apparatus as well as the timing information representing the recording position to acquire the timing information and the file name.

5. The external terminal according to claim 1, wherein
the recording state inquiring unit inquires about identification information for identifying a recording medium in which video data is recorded by the video recording apparatus as well as the timing information representing the recording position to acquire the timing information and the identification information, and
the first storage unit stores the identification information as well as the timing information representing the recording position.

6. The external terminal according to claim 5, further comprising:
a recording medium connecting unit operable to connect the recording medium to the external terminal;
a media ID detecting unit operable to acquire identification information for identifying the recording medium connected in the recording medium connecting unit;
a second storage unit operable to relate the information stored in the first storage unit to the additional information input by the input unit so as to record the related information, when receiving error information as a response to the additional information and the timing information representing the recording position sent from the additional information sending unit to the video recording apparatus;
an additional information collating unit operable to select additional information relating to the identification information about the recoding medium connected in the recording medium connecting unit, from the information recorded in the second storage unit; and
an additional information writing unit operable to read the additional information selected by the additional information collating unit from the second storage unit and record the read information to the recording medium.

7. The external terminal according to claim 5, further comprising:
a recording medium connecting unit capable of connecting the recording medium to the external terminal;
a media ID detecting unit operable to acquire identification information for identifying the recording medium connected in the recording medium connecting unit;
a second storage unit operable to relate the information stored in the first storage unit to the additional information input by the input unit so as to record the related information, when the additional information sending unit fails to communicate with the video recording apparatus via the communication unit;
an additional information collating unit operable to select additional information relating to the identification information about the recoding medium connected in the recording medium connecting unit, from the information recorded in the second storage unit; and
an additional information writing unit operable to read the additional information selected by the additional information collating unit from the second storage unit and record the read information to the recording medium.

8. The external terminal according to claim 1, further comprising:
a recording medium connecting unit capable of connecting the recording medium to the external terminal;
a second storage unit operable to relate the information stored in the first storage unit to the additional information input by the input unit to record the related information therein, when receiving error information as a response to the additional information and the timing information representing the recording position sent from the additional information sending unit to the video recording apparatus; and
an additional information writing unit operable to record the information recorded in the second storage unit to the recording medium connected in the recording medium connecting unit.

9. The external terminal according to claim 1, further comprising:
a recording medium connecting unit operable to connect the recording medium to the external terminal;
a second storage unit operable to relate the information stored in the first storage unit to the additional information input by the input unit to record the related information therein, when the additional information sending unit fails to communicate with the video recording apparatus via the communication unit; and
an additional information writing unit operable to record the information recorded in the second storage unit to the recording medium connected in the recording medium connecting unit.

10. A system comprising:
the external terminal of claim 1; and
a video recording apparatus comprising:
a recording unit operable to record video data;
a communication unit operable to communicate with an external terminal;
a recording position storage unit operable to store latest timing information representing a recording position of the video data currently being recorded; and
a recording state management unit operable to send the timing information representing the recording position of the video data currently being recorded to the external terminal via the communication unit, when receiving a predetermined signal from the external terminal via the communication unit.

* * * * *